United States Patent
Han et al.

(10) Patent No.: US 8,654,414 B2
(45) Date of Patent: Feb. 18, 2014

(54) LED ILLUMINATION SYSTEM FOR A SCANNER INCLUDING A UV LIGHT EMITTING DEVICE

(75) Inventors: Yao Han, Lexington, KY (US); Richard Lee Reel, Georgetown, KY (US); Rebecca Beth Silveston-Keith, Lexington, KY (US); Steven Frank Weed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 127 days.

(21) Appl. No.: 13/307,194

(22) Filed: Nov. 30, 2011

(65) Prior Publication Data
US 2013/0135695 A1     May 30, 2013

(51) Int. Cl.
*H04N 1/04* (2006.01)

(52) U.S. Cl.
USPC ........... 358/475; 358/474; 358/509; 358/505; 362/231

(58) Field of Classification Search
USPC ........... 358/474, 475, 509, 497, 496; 362/231
See application file for complete search history.

(56) References Cited

U.S. PATENT DOCUMENTS

| | | | |
|---|---|---|---|
| 7,358,929 B2 * | 4/2008 | Mueller et al. | 345/1.3 |
| 7,537,170 B2 * | 5/2009 | Reed et al. | 235/494 |
| 7,684,095 B2 * | 3/2010 | Nystrom et al. | 358/514 |
| 7,687,753 B2 * | 3/2010 | Ashdown | 250/205 |
| 7,762,468 B2 * | 7/2010 | Jones et al. | 235/491 |
| 7,843,611 B2 | 11/2010 | Albahri | |
| 7,959,320 B2 * | 6/2011 | Mueller et al. | 362/231 |
| 8,035,287 B2 * | 10/2011 | Schmidt et al. | 313/487 |
| 8,123,134 B2 * | 2/2012 | Reed et al. | 235/491 |
| 8,134,759 B2 | 3/2012 | Albahri | |
| 8,154,775 B2 | 4/2012 | Jeong et al. | |
| 8,203,713 B2 * | 6/2012 | Ramirez Mancilla et al. | 356/406 |
| 2003/0081824 A1 * | 5/2003 | Mennie et al. | 382/135 |
| 2006/0072171 A1 * | 4/2006 | Nystrom et al. | 358/514 |
| 2008/0144013 A1 * | 6/2008 | Lanoue et al. | 356/73 |
| 2011/0122460 A1 | 5/2011 | King et al. | |
| 2011/0122465 A1 | 5/2011 | King et al. | |

OTHER PUBLICATIONS

Tomoko Kotani, Toshiba Lighting and Technology Corporation, Tokyo, Japan, CIE Light and Lighting Conference with Special Emphasis on LEDs and Solid State Lighting, PWDAS-20, "Practical Design of Spectral Power Distributions With Preferable Color Appearance of LED Light Sources", May 27-29, 2009, Budapest, Hungary.

* cited by examiner

*Primary Examiner* — Negussie Worku
(74) *Attorney, Agent, or Firm* — John Victor Pezdek; Justin M. Tromp

(57) ABSTRACT

An illumination system for a scanner according to one example embodiment includes an array of visible light emitting diodes including a red, a blue and a green light emitting diode and an ultraviolet light emitting device configured to emit light predominantly in the ultraviolet region of the electromagnetic spectrum. During a scan sequence of the red, blue and green light emitting diodes, at least one of the visible light emitting diodes and the ultraviolet light emitting device are positioned to simultaneously illuminate an object being scanned. In one form, during the sequence, the blue light emitting diode and the ultraviolet light emitting device are simultaneously illuminated while in another the red light emitting diode and the ultraviolet light emitting device are simultaneously illuminated.

23 Claims, 12 Drawing Sheets

LED ILLUMINATION SYSTEM FOR A SCANNER INCLUDING A UV LIGHT EMITTING DEVICE

CROSS REFERENCES TO RELATED APPLICATIONS

None.

BACKGROUND

1. Field of the Disclosure

The present disclosure relates generally to scanners and more particularly to an LED illumination system for a scanner that includes an ultraviolet light emitting device.

2. Description of the Related Art

Typical contact image sensor (CIS) scanners include an illumination system having one or more light emitting diodes (LEDs). These systems often include a three channel array of red LED(s), green LED(s) and blue LED(s) (collectively, RGB LEDs). Alternatives include those where other colors in the visible spectrum are used such as orange LED(s). During a scanning operation, where a black and white scan is desired, the RGB LEDs may be illuminated simultaneously to form white light. Where a color scan is desired, the RGB LEDs may be illuminated in sequence to successively capture the red, green and blue components of the image being scanned. The scanner may then convert the individual color components into an aggregate image. LEDs are preferred to other conventional light sources, such as fluorescent lamps, because of their low energy requirements. LEDs also emit light at a constant rate as soon as they are turned on. This reduces the warm up time required in comparison with scanners utilizing fluorescent lamps.

Conventional RGB LEDs possess narrow band discrete spectrums that, in some instances, may lead to metameric failure in conventional RGB LED based scanners. Metamerism refers to the matching of the apparent color of an object with different spectral power distributions. The apparent color of an object depends on the spectral reflectance of the object as well as the spectral emittance of the light shining on it. In the case of a document or object to be scanned, the spectral reflectance of the image depends on the chemical composition of the marking material (e.g., ink, toner, etc.) and the chemical composition of the substrate (e.g., plain paper, glossy paper, fabric). For example, an inkjet print can be designed to match the color of a silver halide print when exposed to sunlight or conventional fluorescent office light even though the inkjet print and the silver halide print have different spectral reflectances due to their different chemical compositions. However, when the silver halide print and the inkjet print are subsequently scanned with a scanner that employs an RGB LED illumination system, the resultant scans may have very different colors due to differences in the spectral emittance of RGB LEDs versus sunlight/fluorescent light. As a result, the color of one or both of the scans may appear different from its corresponding original. This, in turn, may lead to customer dissatisfaction with the image quality produced by the scanner.

Given the broad range of substrates and marking materials used in printed materials (e.g., silver halide, inkjet, dye sublimation, and laser prints), it is impossible to provide a single scan color table capable of accurately reproducing the colors of the original in the scan. One solution is to provide multiple color tables each corresponding to a known original type. However, this solution requires that the scanner know the material being scanned and match it with the appropriate color table. One option is to require the user to provide an input to the scanner identifying the chemical nature of the original being scanned. This solution is undesirable because it complicates the user experience and is subject to user error thereby increasing the potential for customer dissatisfaction. Another option is to include a marking or indicia on the front or the reverse side of the material being scanned indicative of the scanner color table that should be used. However, marks on the front of an original might interfere with the content of the original and/or might be found distasteful by the customer. Further, paper manufacturers may resist adding an additional mark to their products. This option is also limited to situations where the material being scanned includes such a marking and the scanner has a sensor that is able to correctly identify the marking. This additional sensor could result in an undesirable cost increase in manufacturing the device.

Accordingly, it will be appreciated that an effective and efficient LED illumination system for a scanner that reduces the occurrence of metameric failure without requiring identification of the chemical nature of the materials being scanned is desired.

SUMMARY

An illumination system for a scanner according to one example embodiment includes an array of visible light emitting diodes each configured to emit light predominantly in the visible region of the electromagnetic spectrum and an ultraviolet light emitting device configured to emit light predominantly in the ultraviolet region of the electromagnetic spectrum. The visible light emitting diodes and the ultraviolet light emitting device are positioned to illuminate an object being scanned.

A document scanner according to one example embodiment includes a housing having a transparent imaging window positioned thereon for supporting a document to be scanned. An illumination system is disposed within the housing and positioned to illuminate the transparent imaging window. The illumination system includes a printed circuit board assembly having an array of light emitting diodes operatively mounted thereto. The array of light emitting diodes includes at least one visible light emitting diode configured to emit light predominantly in the visible region of the electromagnetic spectrum and at least one ultraviolet light emitting diode configured to emit light predominantly in the ultraviolet region of the electromagnetic spectrum. An image sensor is positioned to sense an image of the document being scanned.

A method for illuminating an object being scanned to reduce the occurrence of metameric failure associated with the scan according to one embodiment includes illuminating the object being scanned by activating a light emitting diode that emits predominantly visible light and illuminating the object being scanned by activating a light emitting device that emits predominantly ultraviolet light. An image sensor is used to sense an image of the object being scanned.

BRIEF DESCRIPTION OF THE DRAWINGS

The above-mentioned and other features and advantages of the various embodiments, and the manner of attaining them, will become more apparent and will be better understood by reference to the accompanying drawings.

DETAILED DESCRIPTION

Figure 1:
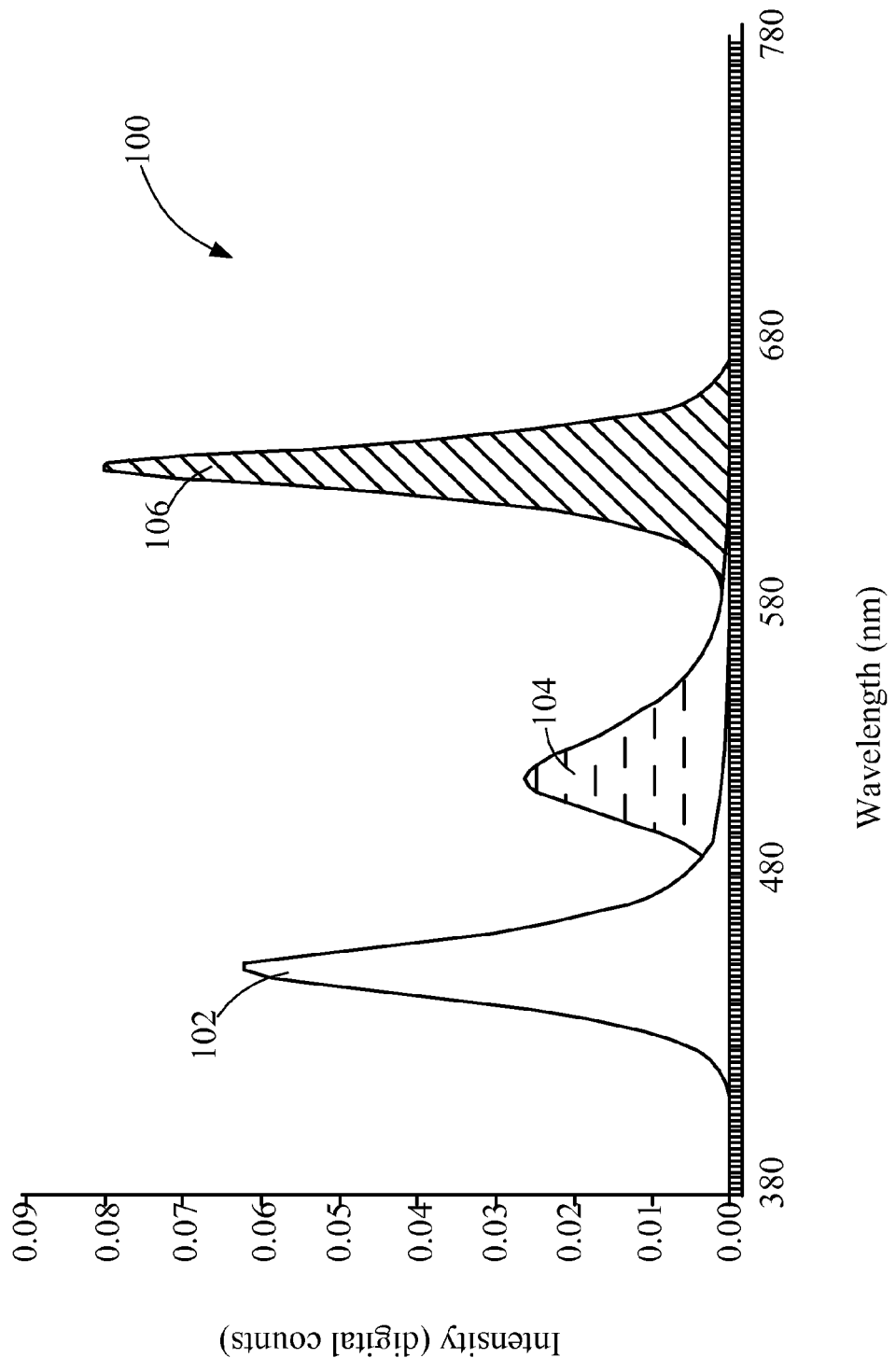
FIG. 1 is a graph of intensity versus wavelength that shows the spectral distribution of an RGB LED illumination system used in a conventional CIS scanner.

The following description and drawings illustrate embodiments sufficiently to enable those skilled in the art to practice the present invention. It is to be understood that the disclosure is not limited to the details of construction and the arrangement of components set forth in the following description or illustrated in the drawings. The invention is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense and the scope of the present invention is defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 2:
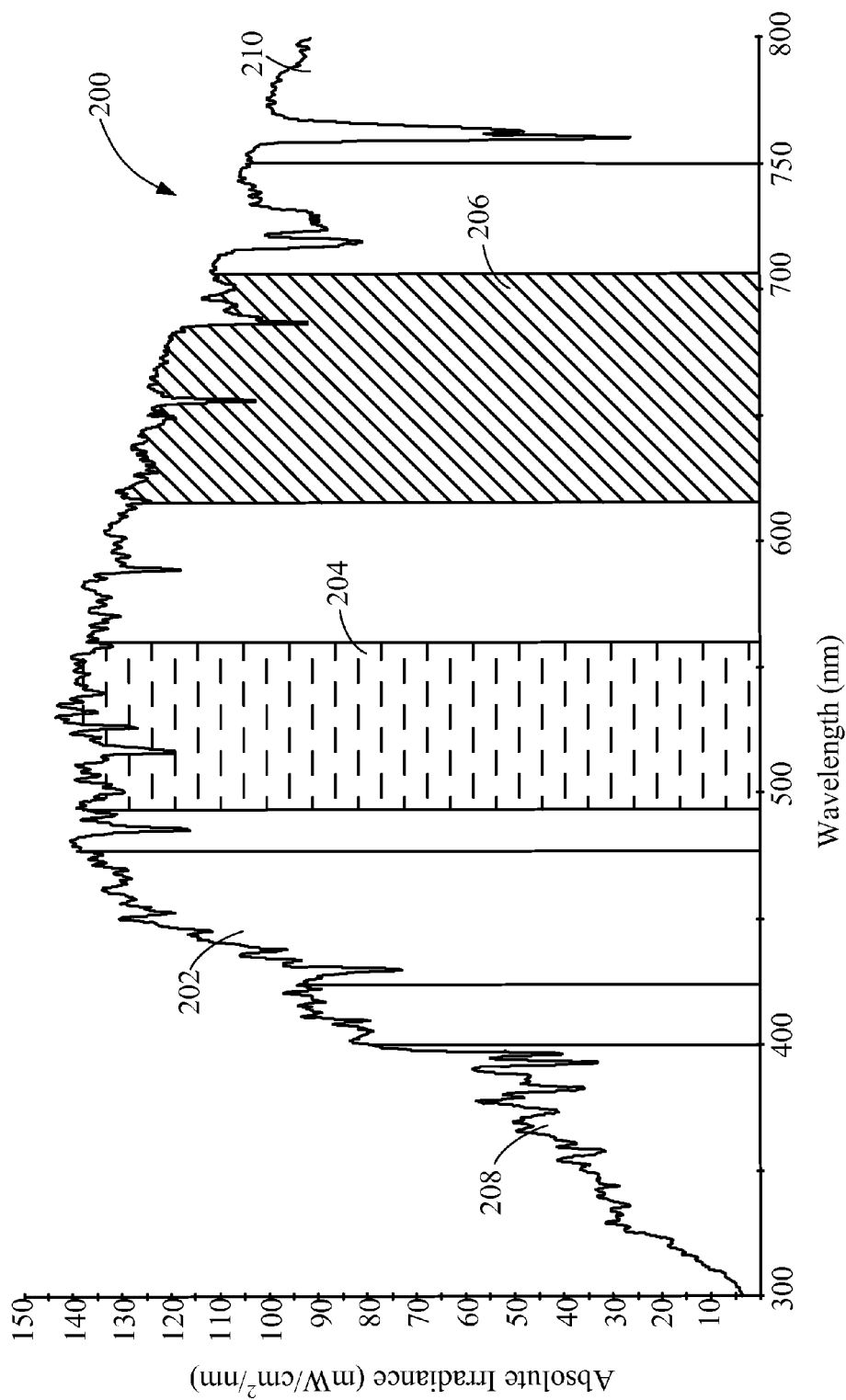
FIG. 2 is a graph of absolute irradiance versus wavelength that shows the spectral distribution of sunlight.
Figure 3:
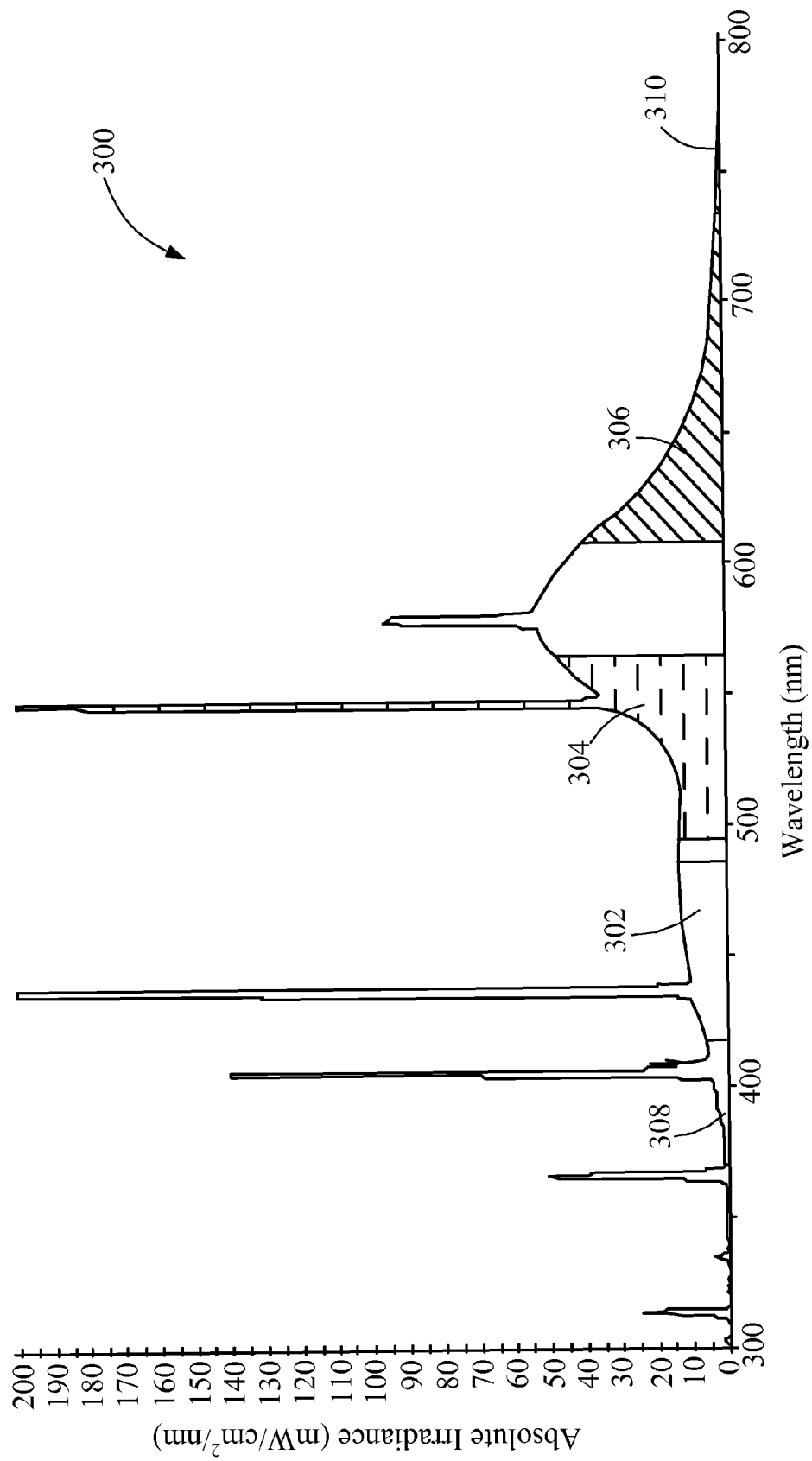
FIG. 3 is a graph of absolute irradiance versus wavelength that shows the spectral distribution of conventional fluorescent office light.

FIG. 1 shows a graph 100 of the spectral distribution of an RGB LED illumination system used in a conventional CIS scanner. Plots 102, 104, and 106 illustrate the individual spectrums of the blue, green and red LEDs, respectively. In comparison, FIG. 2 illustrates a graph 200 of the spectral distribution of sunlight. Spectral areas 202, 204, and 206 in graph 200 correspond to blue light, green light, and red light, respectively. FIG. 3 illustrates a graph 300 of the spectral distribution of conventional fluorescent office light. Spectral areas 302, 304, and 306 in graph 300 correspond to blue light, green light, and red light, respectively. It can be seen that the blue, green and red regions of sunlight and fluorescent office light are much broader than the corresponding blue, green and red regions of a conventional RGB LED illumination system. As a result, RGB LED illumination systems are unable to replicate the spectral distribution of sunlight or fluorescent office light. Further, the spectral distributions of sunlight and fluorescent office light span from the near ultraviolet (UV) regions 208, 308, respectively, from 300 nanometers (nm) to 400 nm into the near infrared (IR) regions 210, 310, respectively, from 750 nm to 1,400 nm. The narrow band spectrum of a conventional RGB LED illumination system does not include UV or IR components.

In order to quantify the metamerism associated with a conventional RGB LED based scanner, a color table was developed to match 729 patches of colors based on a nine cube of colors covering the three dimensional color space (e.g., the International Commission on Illumination (CIE) L*, a*, b* color model, the R, G, B color model, etc.) for both an inkjet print and a silver halide print. Spectral responses of the 729 inkjet patches were measured by an EYE-ONE® iSis automatic color chart reader available from X-Rite, Inc., Grandville, Mich., USA. The responses were then compared to corresponding silver halide patches and it was confirmed that the inkjet print was a very good metameric color match to the silver halide print. The spectral responses of the 729 inkjet patches were then compared to the corresponding silver halide patches using a RGB LED based CIS scanner and an optical lens reduction charge coupled device (CCD) scanner that uses a Xenon lamp light source. The RGB LED based scanner used was a LEXMARK P6250 all-in-one printer and scanner available from Lexmark International, Inc., Lexington, Ky., USA. The Xenon lamp scanner used was an EPSON PERFECTION V700 scanner available from Epson America, Inc., Long Beach, Calif., USA.

Figure 4:
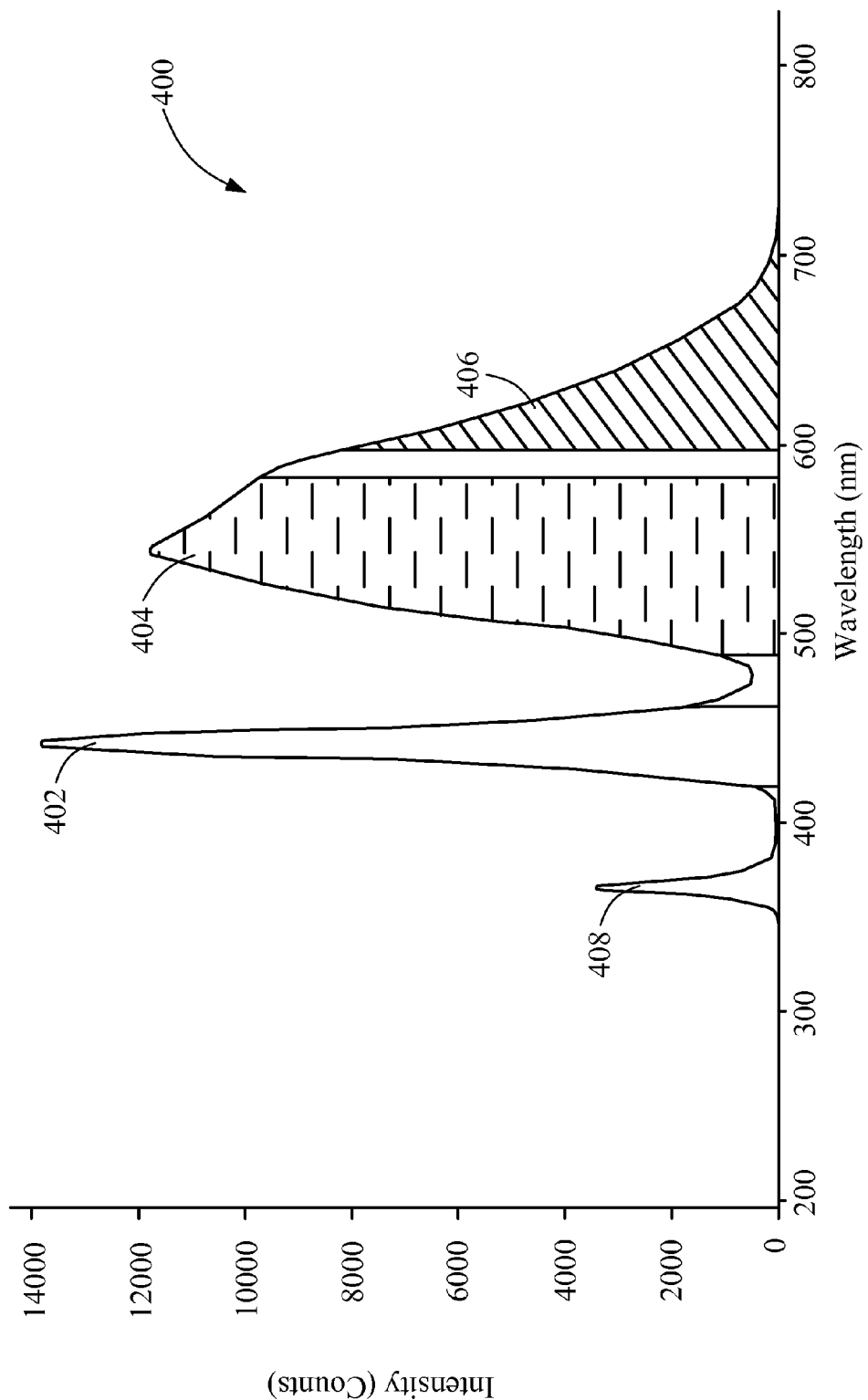
FIG. 4 is a graph of intensity versus wavelength that shows the spectral distribution of bright white light produced by an EYE-ONE® iSis automatic color chart reader.
Figure 5:
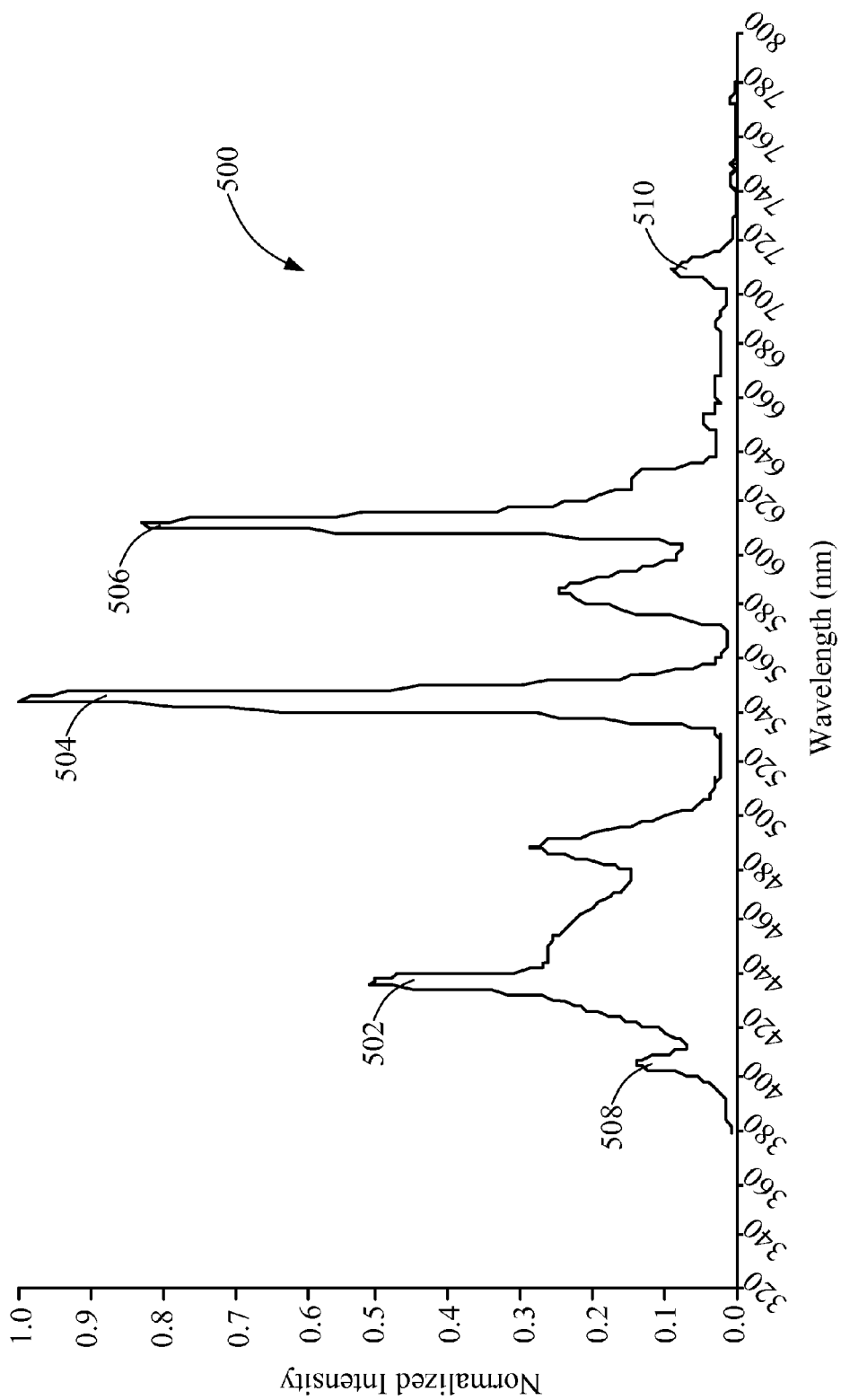
FIG. 5 is a graph of normalized intensity versus wavelength that shows the spectral distribution of a Xenon lamp used in an EPSON PERFECTION V700 scanner.

FIG. 4 illustrates a graph 400 of the spectral distribution of bright white light produced by the EYE-ONE® iSis automatic color chart reader. Spectral areas 402, 404, and 406 in graph 400 correspond to blue light, green light, and red light, respectively. As depicted in FIG. 4, the light distribution of the white light is broad and includes a distinct peak 408 in the ultraviolet light range that is absent in a typical RGB LED based scanner such as graph 100 shown in FIG. 1. FIG. 5 illustrates a graph 500 of the spectral distribution of the Xenon lamp used by the EPSON PERFECTION V700 scanner. Spectral areas 502, 504, and 506 correspond to blue light, green light, and red light regions, respectively, of the Xenon lamps. As depicted in FIG. 5, the light distribution of the Xenon lamp is broader than the distribution of a typical RGB LEDs' light distribution such as graph 100 in FIG. 1. The Xenon lamp's light distribution includes a near UV region 508 and a near IR region 510 whereas the RGB LEDs' light distribution does not.

Table 1 below illustrates the effect of scanner technology on scan color fidelity and metamerism for white light, a Xenon lamp based scanner, and an RGB LED based scanner.

TABLE 1

|  | White Light | Xenon Lamp | RGB LED |
| --- | --- | --- | --- |
| Source | EYE-ONE® iSis | EPSON PERFECTION V700 | LEXMARK P6250 |
| Data Type | Raw data | Image processed | Image processed |
| Delta Type Measured | ΔE* | ΔRGB | ΔRGB |
| Average Delta (Δ) | 2.5 | 7.0 | 16.0 |
| Maximum Δ | 7.3 | 26.5 | 39.1 |
| Number of patches with Δ > 17 | None | 23 | 320 |
| Percentage (%) of patches above Δ > 17 | None | 3.2% | 43.9% |

As illustrated in Table 1, the resultant difference (CIE distance metric ΔE*) between the silver halide print and the inkjet print when using the bright white light was a value of 2.5. For comparison, an average ΔE* (or ΔRGB where the R, G, B color model is used) value of three represents the point in which a person skilled in the art may observe a difference in two colors. An average ΔE* (or ΔRGB) value of five represents the point in which an ordinary observer (as opposed to one skilled in the art of color science) with a high level of color sensitivity may begin to observe a difference in two colors. In the scanner industry, a maximum ΔE* (or ΔRGB) value of seventeen is customarily used as the threshold governing whether a color difference is acceptable or unacceptable such that a value of greater than seventeen is deemed unacceptable. As a result, the average ΔE* value of 2.5 and the maximum ΔE* value of 7.3 indicate that very little metameric failure was experienced when the silver halide print and the inkjet print were evaluated under the white light of the EYE-ONE® iSis automatic color chart reader. Scans of the same 729 inkjet and silver halide patches using the Xenon lamp based scanner exhibited a higher average and maximum resultant difference (measured ΔRGB) than the white light. Over 3% of the 729 patches were deemed to have an unacceptable color difference between the inkjet and silver halide prints. Scans of the same color patches using the RGB LED based scanner exhibited increased metameric failure. The average and maximum resultant differences (measured ΔRGB) were greater than white light and the Xenon lamp based scanner. Nearly 44% of the patches exhibited an unacceptable color difference between the inkjet and silver halide prints. The worst metameric failure was observed in the blue and green regions of the color space.

Figure 6:
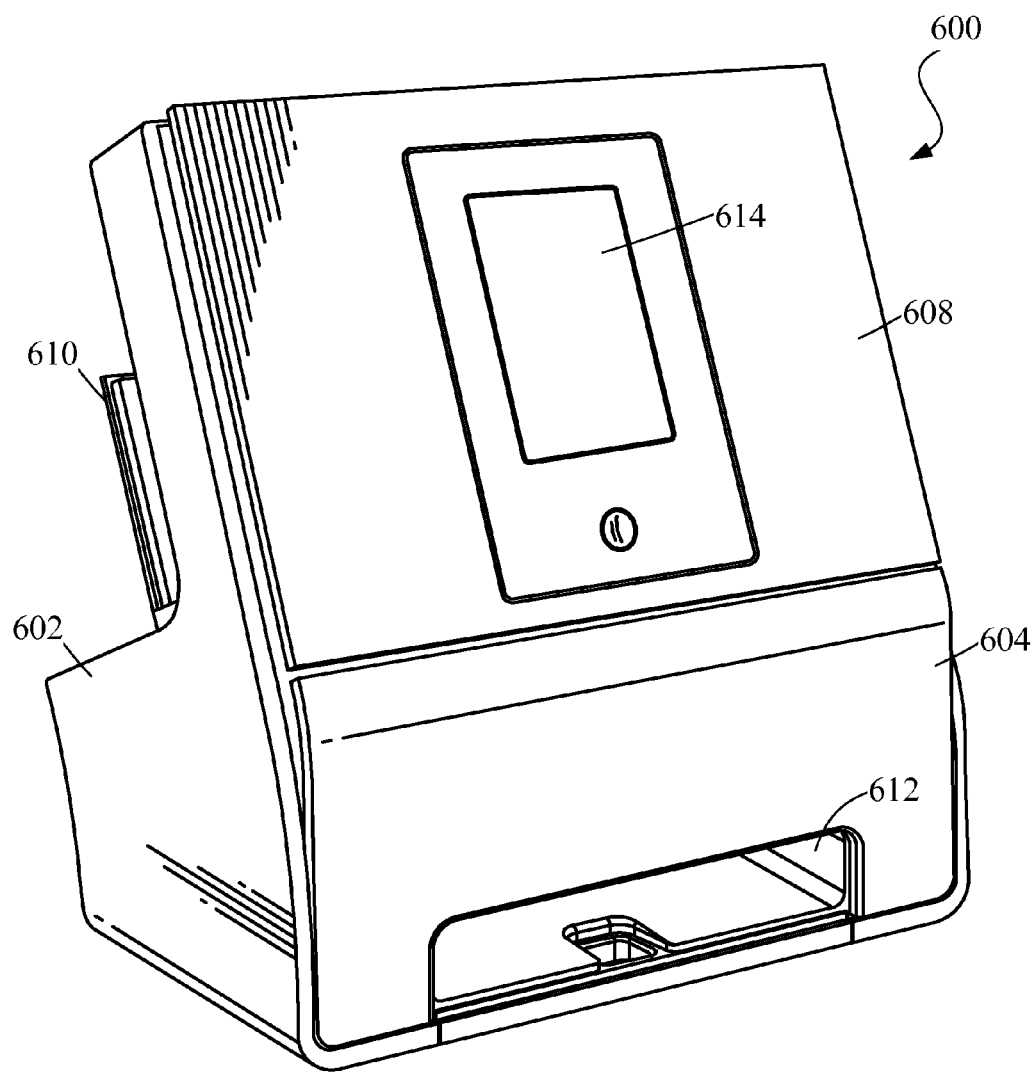
FIG. 6 is a front perspective view of an imaging device according to one example embodiment.
Figure 7:
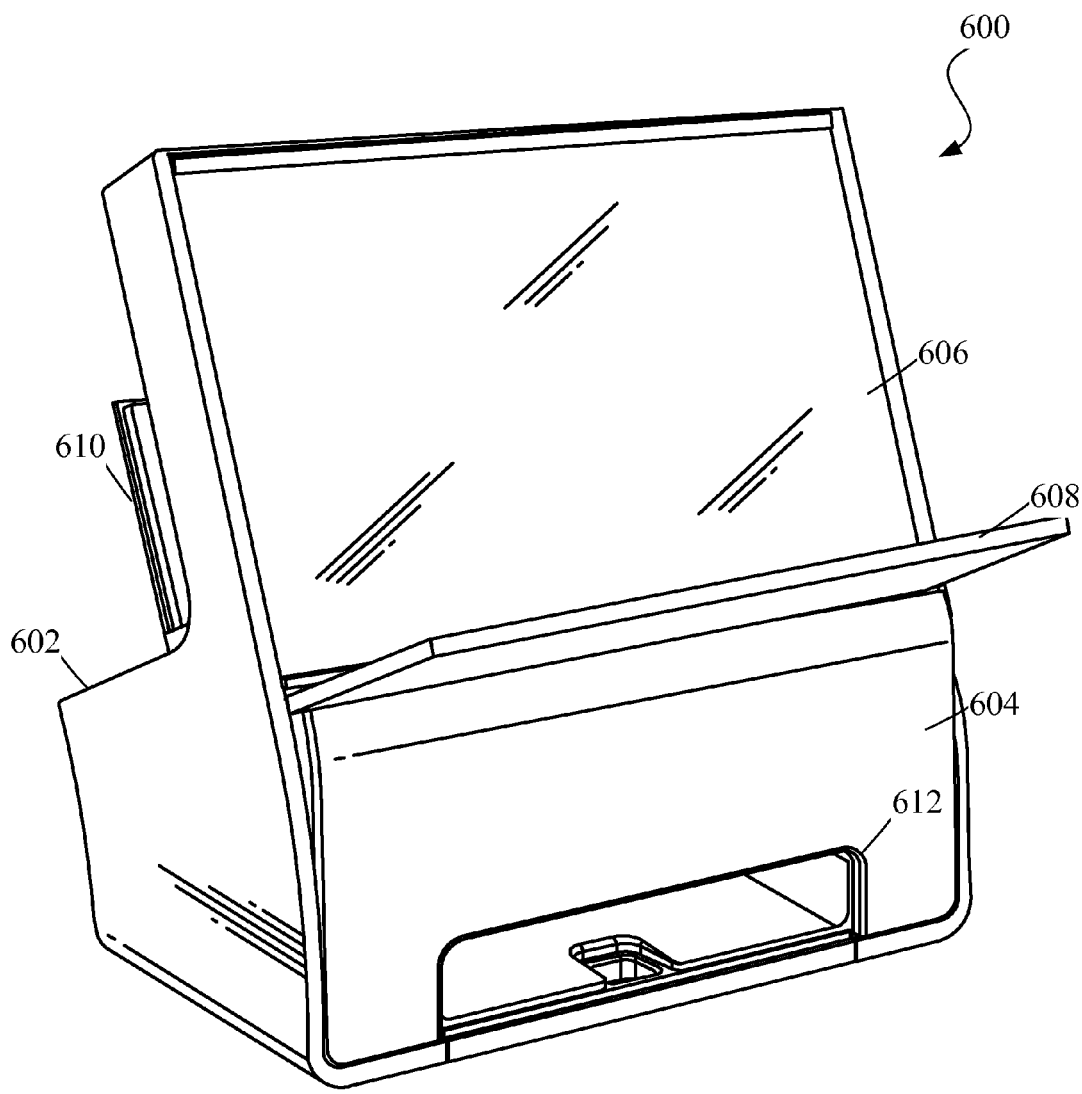
FIG. 7 is a rear perspective view of the imaging device shown in FIG. 6.

FIGS. 6 and 7 illustrate perspective views of an imaging device 600 according to one example embodiment of the present disclosure. Imaging device 600 includes a housing 602 having a front portion 604 including an imaging window 606 (FIG. 7). Imaging window 606 may be constructed from a rigid, transparent and/or translucent material, such as glass. Imaging device 600 also includes a lid 608 pivotally connected to the front portion 604 of housing 602. Lid 608 may be pivotally connected along a bottom edge thereof to housing 602 via hinges or the like (not shown) to allow lid 608 to move between a closed position as shown in FIG. 6 and an open position as shown in FIG. 7. The back portion of imaging device 600 may have an input media tray 610 that retains one or more print media sheets therein. A media output area 612 may be positioned along a lower part of front portion 604.

Figure 8:
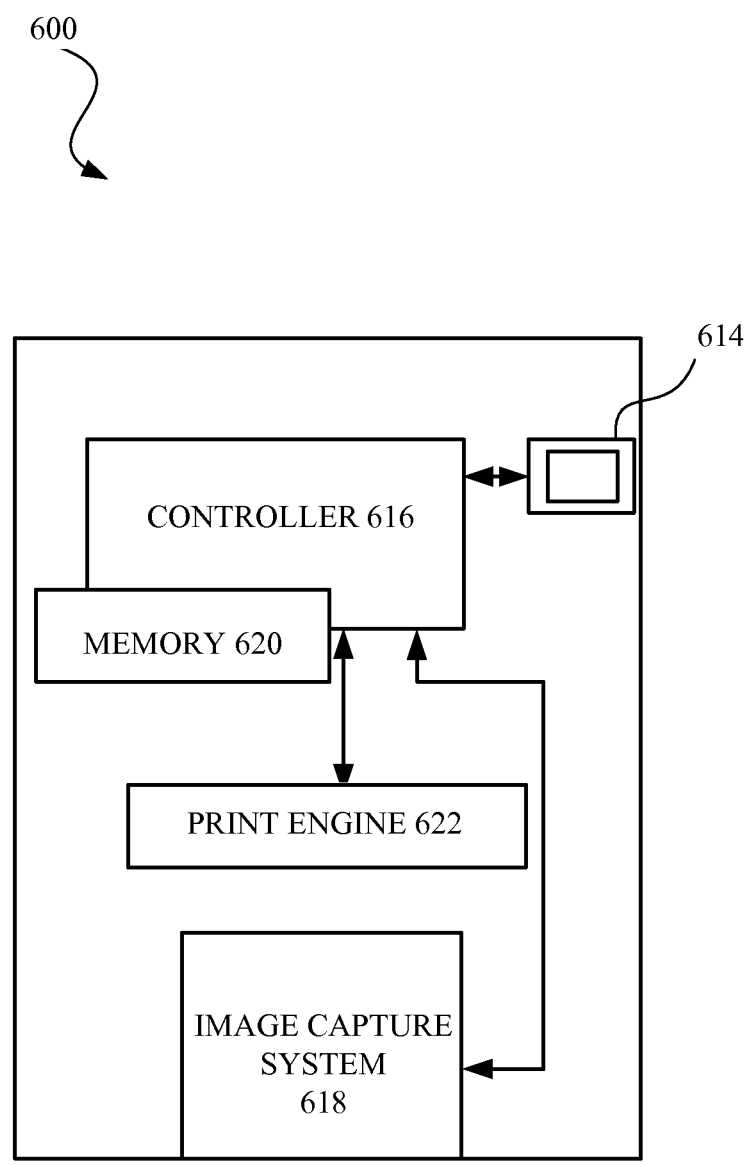
FIG. 8 is a block diagram of the main components of the imaging device shown in FIG. 6.

FIG. 8 is a block diagram depicting at least some of the main components of imaging device 600. Imaging device 600 includes an image capture system 618 positioned within a housing 602 that captures an image from one or more documents or objects placed against imaging window 606. Image capture system 618 may be coupled to and controlled by a controller 616 of imaging device 600. Imaging device 600 may also optionally include a print engine 622, controlled by controller 616, for forming an image onto a sheet of media. Print engine 622 may include any of a variety of different types of printing mechanisms including dye-sublimation, dot-matrix, ink-jet or laser printing. Imaging device 600 may include one or more mechanisms (not shown) for picking a sheet of media from input media tray 610, moving the picked sheet to be adjacent to print engine 622 for printing an image thereon or adjacent to image capture system 618 for scanning an image thereon, and moving the picked sheet having the printed image to output area 612.

Imaging device 600 may include a user interface, such as a graphical user interface, for receiving user input concerning image formation or image capture operations performed or to be performed by imaging device 600, and for providing information to the user concerning same. The user interface may include firmware maintained in memory 620 within housing 602 which is performed by controller 616 or other processing element. In the example embodiment illustrated, the graphical user interface includes a display panel 614, which may be a touch screen display in which the user input is provided by the user touching or otherwise making contact with panel 614. As shown in FIG. 6, display panel 614 may be disposed along the outer surface of lid 608 and sized for providing graphic images that allow for convenient communication of information between imaging device 600 and the user. Display panel 614 may include a liquid crystal display, a light emitting diode display or the like.

Figure 9:
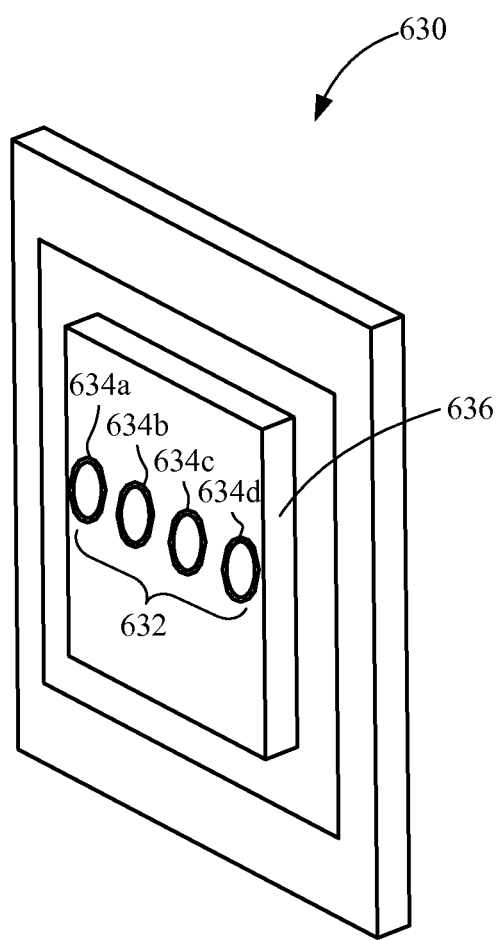
FIG. 9 is a perspective view of an illumination system according to one example embodiment.

FIG. 9 depicts an illumination system 630 for image capture system 618 of imaging device 600. Illumination system 630 includes an array 632 of LEDs 634 operatively mounted on a printed circuit board (PCB) assembly 636. LEDs 634 may be positioned on PCB assembly 636 in any pattern desired to provide the desired illumination. For example, LEDs 634 may be arranged in one or more rows or columns as shown in FIG. 9. Array 632 includes one or more LEDs that emit visible light to illuminate a document or object being scanned. Array 632 may include three types of light emitting diodes each configured to emit light at a different wavelength along the visible spectrum. Specifically, in one embodiment, array 632 includes at least one red LED 634a, at least one blue LED 634b and at least one green LED 634c. Alternatively, one or more white LEDs may be used in place of, or in addition to, the red 634a, green 634b and blue 634c LEDs. In one embodiment, array 632 also includes at least one ultraviolet LED 634d positioned to emit UV light on the document or object being scanned. The light emitted by UV LED 634d resides predominantly in the UV region of the electromagnetic spectrum. Alternatives include those wherein illumination system 630 includes a UV emitting device other than an LED such as, for example a UV fluorescent lamp. As is known in the art, each of the LEDs 634 is activated by a drive current from PCB assembly 636, which may be controlled by controller 616 or another processing device. The higher the drive current supplied, the brighter the LED. Each LED's current and configuration may be optimized based on the light intensity desired.

During a scanning operation, where a black and white scan is desired, the red 634a, green 634b and blue 634c LEDs may be illuminated simultaneously to form white light. Alternatively, white LEDs may be used in place of the red 634a, green 634b and blue 634c LEDs. Where a color scan is desired, the red 634a, green 634b and blue 634c LEDs may be illuminated in sequence to successively capture the corresponding red, green and blue components of the image being scanned.

Controller 616 or another processing element then converts the three image components into a single full color image.

UV LED(s) 634*d* may be operated in combination with one or more of the red 634*a*, green 634*b* and blue 634*c* LEDs or they may be operated independently. In all cases, gamma correction is preferably performed on the UV LED(s) 634*d* in order to increase the linearity of the UV light emitted by UV LED(s) 634*d*. During a color scan operation, UV LED(s) 634*d* may be illuminated independently from the red 634*a*, green 634*b* and blue 634*c* LEDs. However, it will be appreciated that this adds a fourth image component to the color image scan requiring four separate illuminations (i.e., red, blue, green and UV) which may extend the time required to perform a scanning operation. This also requires controller 616 to combine four images, rather than three, thereby complicating the firmware requirements of imaging device 600 further. Accordingly, for a color scan operation, it may be desired to activate UV LED(s) 634*d* simultaneously with one or more of the red 634*a*, green 634*b* and blue 634*c* LEDs. Specifically, UV LED(s) 634*d* may be activated simultaneously with red LED(s) 634*a*, green LED(s) 634*b*, blue LED(s) 634*c*, or a combination thereof. This allows a color scan to be conducted in three light cycles in order to avoid increasing the scan time and to limit the firmware concerns. Simultaneous activation can be accomplished by coupling the drive current for UV LED(s) 634*d* with the drive current for one or more of the red 634*a*, green 634*b* and blue 634*c* LEDs as desired. Alternatively, the drive current for UV LED(s) 634*d* may be separate from the drive currents for red LED(s) 634*a*, green LED(s) 634*b*, and blue LED(s) 634*c* and controller 616 may be programmed to supply the drive current to UV LED(s) 634*d* concurrently with the drive current for one or more of red LED(s) 634*a*, green LED(s) 634*b*, and blue LED(s) 634*c* as desired.

Similarly, during a black and white scan, UV LED(s) 634*d* may be illuminated simultaneously with the rest of the LEDs 634 in array 632 by coupling their respective drive currents so that the light provided to the document or object being scanned includes an ultraviolet component. Alternatively, UV LED(s) 634*d* may be illuminated separately from the visible light emitting LEDs of array 632 during a black and white scan such that two image portions are captured. Controller 616 or another processing element may then convert the two image portions into a single black and white image. However, this alternative presents the same time and firmware concerns discussed above.

The intensity of the light emitted by UV LED(s) 634*d* (or another UV emitting device) may be optimized to reduce the metameric failure experienced in a typical RGB LED based scanner by matching the spectral distribution of the scanner with sunlight, conventional fluorescent office light or conventional white light. This allows improved scanning using a single color table and substantially eliminates the need to know the chemical nature or the spectral reflectance of the materials being scanned. The addition of a UV component to the light source takes advantage of the differences in brightening agents typically used in print materials. Brightening agents are typically added to print media to balance the yellowish tint of the substrate material to make the print media appear whiter and brighter. Typical brightening agents include various dyes such as optical brighteners, optical brightening agents, fluorescent brightening agents, and fluorescent whitening agents. These dyes absorb light in the UV and violet regions of the electromagnetic spectrum (typically from about 340 nm to about 370 nm) and re-emit light in the blue region (typically from about 420 nm to about 470 nm). As a result, the brightening agents are excited by sunlight, conventional fluorescent light, conventional white light and, to some extent, Xenon light. However, the brightening agents are not excited by conventional RGB LED light. As a result, adding a UV component to the RGB LED light source increases the light reflected from the substrate in the blue region of the electromagnetic spectrum, where the most metameric failure was observed. Accordingly, in one embodiment, UV LED(s) 634*d* are coupled with blue LED(s) 634*c* such that UV LED(s) 634*d* are illuminated simultaneously with blue LED(s) 634*c*. In this embodiment, the increase in light reflected from the substrate in the blue region of the electromagnetic spectrum caused by the introduction of UV light is captured by the scanner during the scan of the blue components of the document or object being scanned.

Figure 10:
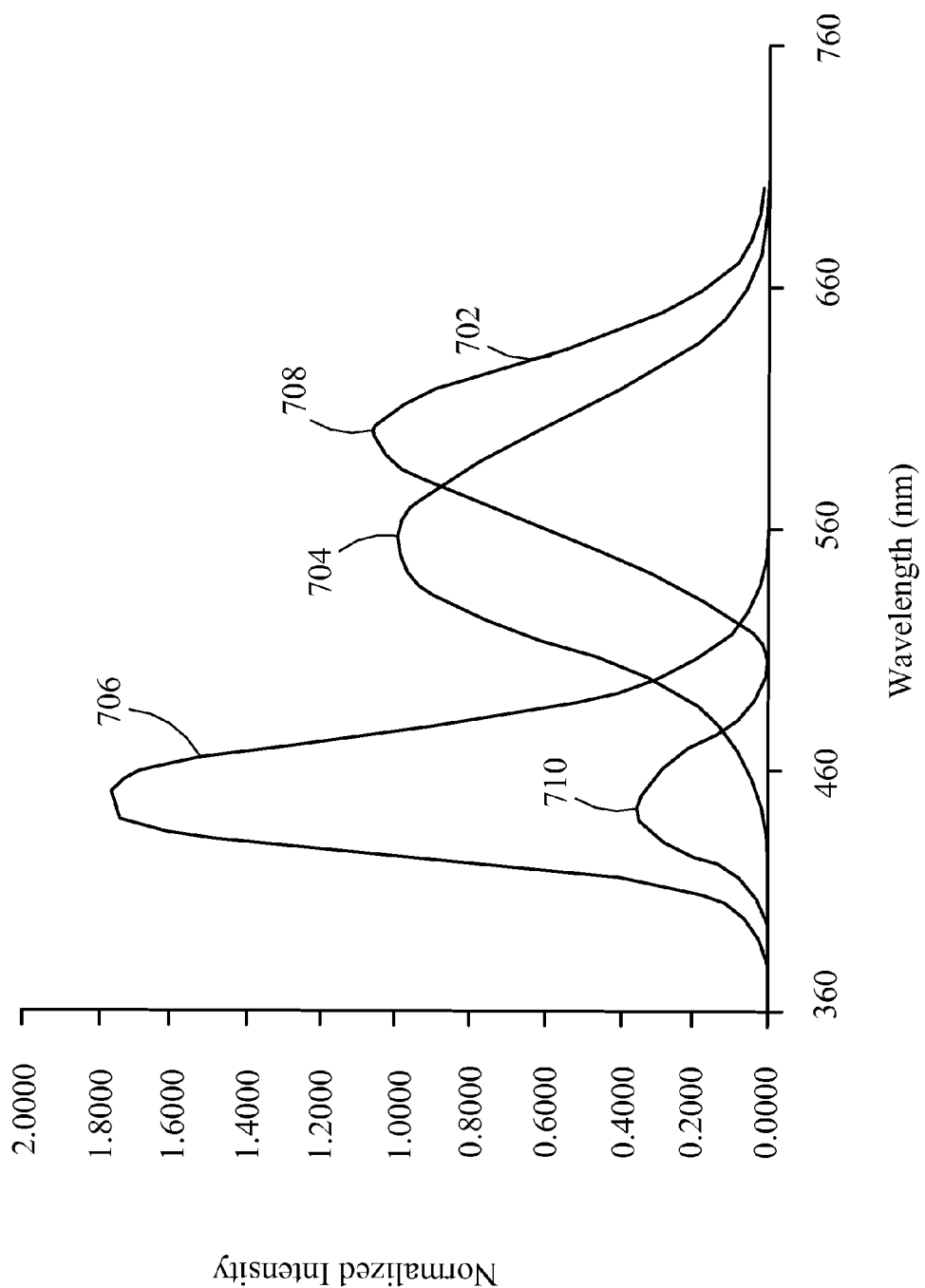
FIG. 10 is a graph of normalized intensity versus wavelength that shows the xbar($\lambda$), ybar($\lambda$) and zbar($\lambda$) 706 color matching functions developed by the International Commission on Illumination.

In another embodiment, UV LED(s) 634*d* are coupled with red LED(s) 634*a* such that UV LED(s) 634*d* are illuminated simultaneously with red LED(s) 634*a*. FIG. 10 illustrates a graph 700 depicting the xbar($\lambda$) 702, ybar($\lambda$) 704 and zbar($\lambda$) 706 color matching functions developed by the CIE. As is known in the art, these color matching functions represent a numerical description of the chromatic response of the CIE 1931 2° Standard Observer as defined by the CIE. As illustrated in FIG. 10, the xbar($\lambda$) curve 702 features a primary peak 708 in the red region of the electromagnetic spectrum (from about 510 nm to about 690 nm with a maximum at about 605 nm) and a secondary peak 710 in the blue region of the electromagnetic spectrum (from about 380 nm to about 480 nm with a maximum at about 445 nm). In this embodiment, where the red LED(s) 634*a* and the UV LED(s) 634*d* are illuminated simultaneously, the resulting reflectance from the document being scanned includes a primary portion in the red region and a secondary portion in the blue region of the electromagnetic spectrum. This reflectance roughly matches the xbar($\lambda$) curve 702 and thereby more closely aligns the illumination wavelength of imaging device 600 with the relative spectral sensitivity curves of the L, M and S cones in the human eye.

Figure 11:
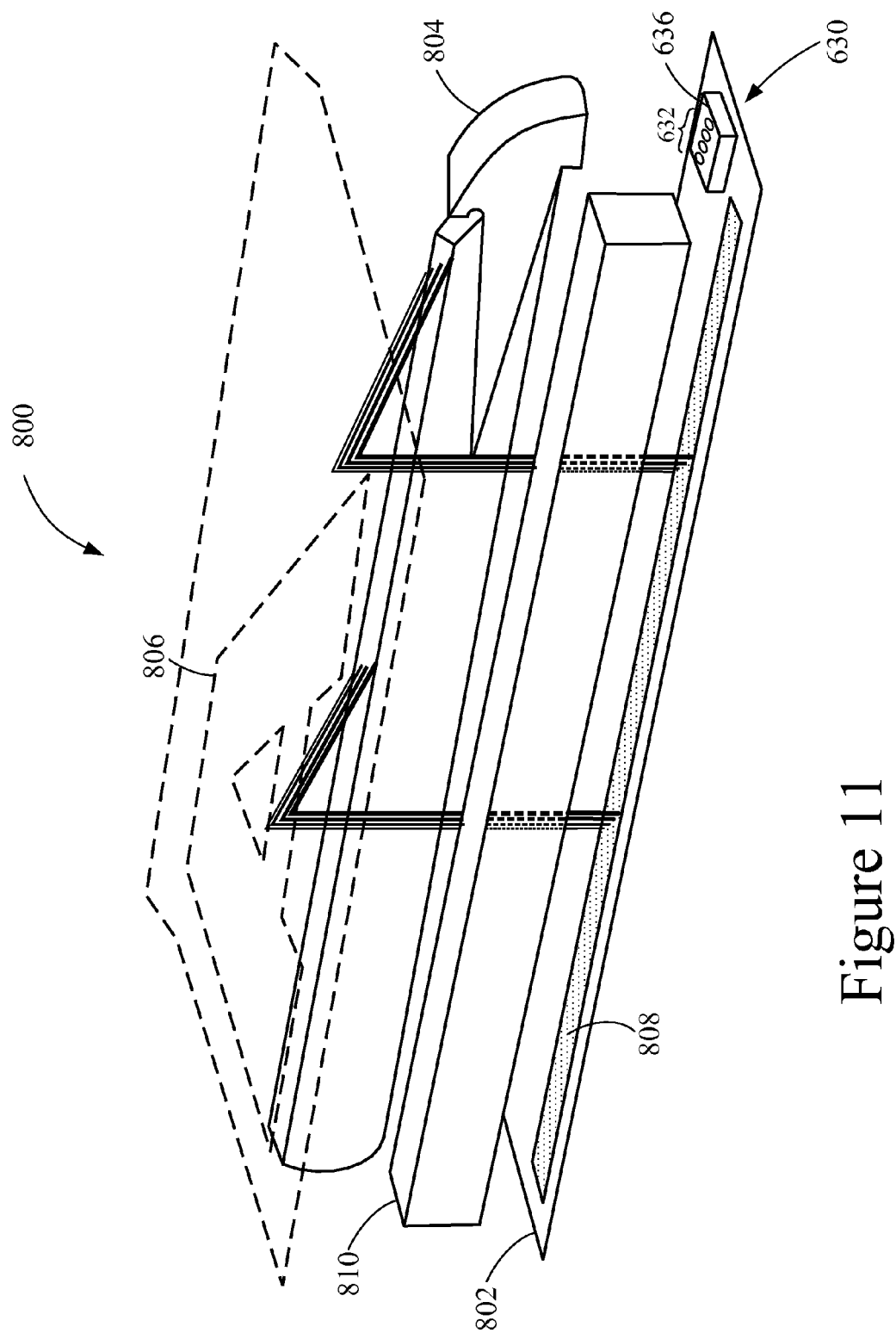
FIG. 11 is a schematic perspective view of a first example embodiment of an image capture system that employs the illumination system shown in FIG. 9.

Illumination system 630, which includes array 632 of LEDs 634 mounted on PCB assembly 636, may be utilized in any suitable image capture system, as desired. For example, FIG. 11 illustrates an example image capture system 800 that includes illumination system 630. In this embodiment, illumination system 630 is mounted within housing 602 on a scan head frame 802. Scan head frame 802 is positioned under imaging window 606. In this embodiment, scan head frame 802 is driven in a reciprocating back and forth motion under imaging window 606 by a driving mechanism (not shown) as is known in the art. Alternatives include those wherein scan head frame 802 is mounted or temporarily held in a stationary manner such as along a media path of an automatic document feeder as is known in the art.

A light guide 804, which may include one or more lenses and/or reflectors such as mirrors, is positioned in the optical path of LEDs 634. Light guide 804 distributes the light received from LEDs 634 through imaging window 606 to illuminate at least a portion of an object being scanned such as a media sheet 806. The light from LEDs 634 is reflected from media sheet 806 onto an image sensor 808 such as, for example a contact image sensor (CIS), a complementary metal oxide semiconductor (CMOS) sensor, or a charge coupled device (CCD) sensor that senses the image being scanned. A lens assembly 810 having one or more lenses may be used to focus the light from media sheet 806 onto image sensor 808. Controller 616 is in communication with image sensor 808 to receive the scanned image from image sensor 808. The scanned image may then be printed, stored or transmitted as desired at the direction of controller 616. In this embodiment, illumination system 630 successively illuminates, and image sensor 808 successively captures, discrete segments of the object being scanned (such as lateral segments of media sheet 806) as scan head frame 802 moves from one end of imaging window 606 to the other or, where an automatic document feeder is used, as the media sheet 806 advances past imaging window 606.

Figure 12:
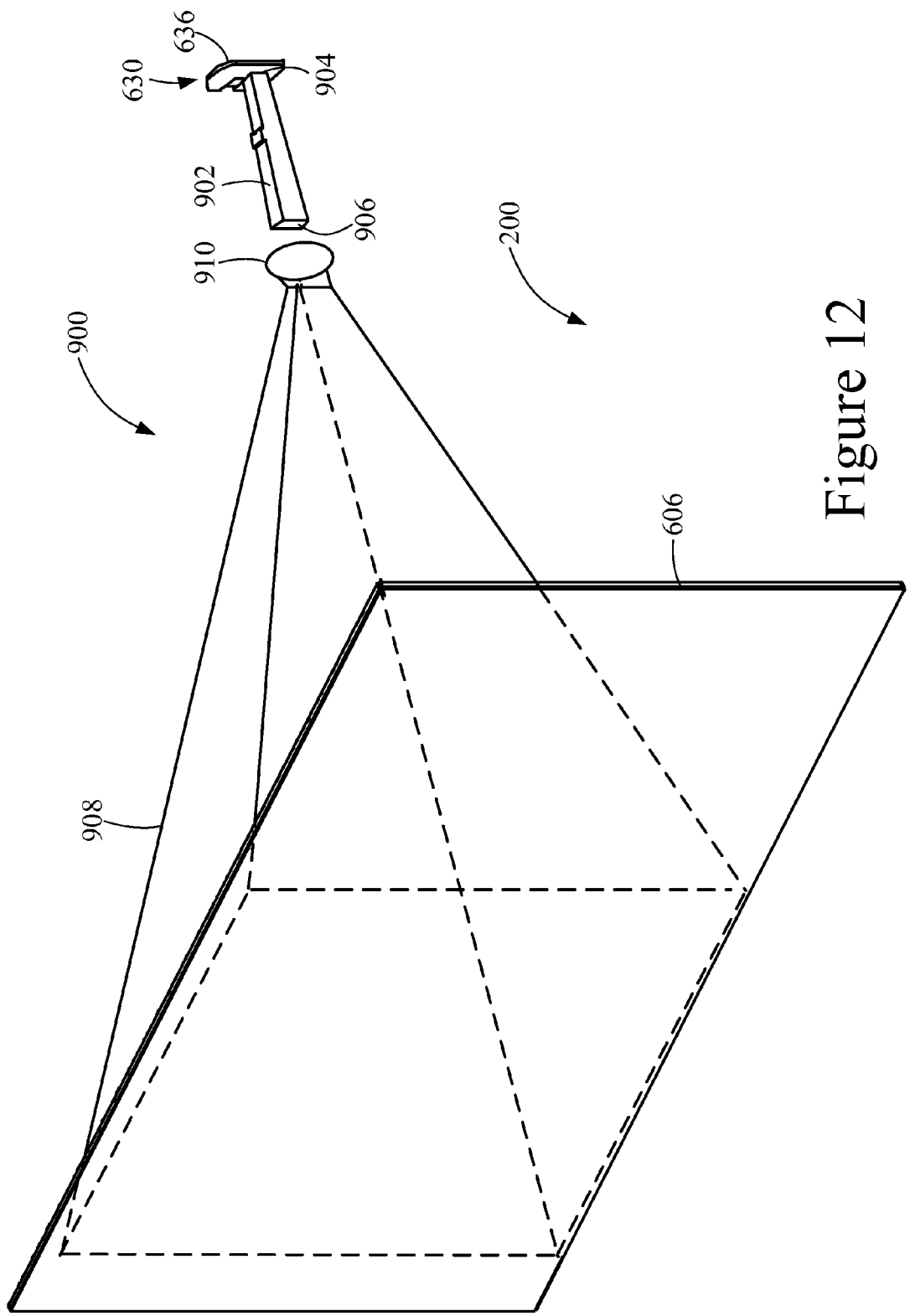
FIG. 12 is a schematic perspective view of a second example embodiment of an image capture system that employs the illumination system shown in FIG. 9.

FIG. 12 illustrates a second example image capture system 900 that includes illumination system 630. Image capture system 900 may be used to illuminate substantially the entire imaging window 606 and, therefore, is particularly useful with a camera based scanner. In this embodiment, illumination device 630 is positioned within housing 602 behind imaging window 606. Illumination device 630 includes array 632 of LEDs 634 mounted on PCB assembly 636 (FIG. 9). Image capture system 900 also includes an integrating light pipe 902. Light pipe 902 includes an input face 904 that is positioned to receive light from LEDs 634 and an output face 906 that transmits the light from LEDs 634 along an optical path 908 onto imaging window 606. As is known in the art, a light pipe is a tapered optic design that is used to convert a point light source, such as an LED, to a larger uniformly illuminated two dimensional surface. Light pipe 902 corrects illumination non-uniformities caused by the differences in the relative positions of LEDs 634 by way of total internal reflection. Each LED 634 is referred to as an individual channel of a multi-channel light source and may vary in position with respect to input face 904. As desired, output face 906 of light pipe 902 may also provide collimation of the light rays from LEDs 634.

Image capture system 900 further includes a projection element 910 that is positioned to focus the light from output face 906 of light pipe 902 onto imaging window 606 so that the object being scanned can be imaged by an image sensor. In the example embodiment illustrated, projection element 910 is a combination of a condenser and objective lens. In one embodiment, the condenser is a biconvex aspherical lens. However, projection element 910 may be any suitable device, or combination of devices, for focusing light from output face 906 of light pipe 902 to imaging window 606 such as a curved minor or a multi-element system. As illustrated in FIG. 12, a direct optical path 908 may be provided from projection element 910 to imaging window 606 such that the light from projection element 910 is not diverted or folded by mirrors or the like. Alternatively, one or more mirrors may be positioned between projection element 910 and imaging window 606 in order to reduce the footprint of image capture system 900 to permit a reduction in size of housing 602. As with image capture system 800, the light is reflected from the object being scanned to an image sensor (not shown) such as a CIS, CMOS or CCD type image sensor.

A single array 632 of LEDs 634 may be used to illuminate the entirety of imaging window 606. Alternatively, multiple arrays 632 of LEDs 634 may be used in combination to illuminate imaging window 606 by positioning each array 632 along with a corresponding light pipe 902 and projection element 910 to illuminate a portion of imaging window 606. Each array 632 may illuminate a discrete section of imaging window 606 or the various illuminated portions may overlap. Controller 616 or another processing element may then be used to piece together the individual portions and discard any overlapping areas to form the completed image.

Because image capture system 900 illuminates substantially the entire imaging window 606, the total exposure time of the internal components of imaging device 600 to UV light is quite brief. As a result, image capture system 900 signifi-cantly reduces the likelihood of degradation of imaging device components made from materials known to degrade under extended exposure to UV light, such as polycarbonate plastics.

In one embodiment, controller 616 is programmed to turn off the UV light emitting device employed, such as UV LED(s) 634d, when lid 608 is opened even if a scanning operation is underway in order to prevent the user from being exposed to UV light. It will be appreciated that the intensity of the UV light contemplated herein is unlikely to adversely affect the user; however, this embodiment may be employed where an abundance of caution is desired. A conventional mechanical flag sensor or optical sensor in communication with controller 616 may be used to determine if lid 608 is open or closed.

EXAMPLE

The following example is provided to further illustrate the teachings of the present disclosure, not to limit its scope.

The effectiveness of an RGB LED based scanner having a UV light emitting component at improving metameric performance was evaluated using the following test.

Inkjet and silver halide prints (6 inch by 7 inch) were prepared each having 729 patches of colors based on a nine cube of colors covering the three dimensional color space. The prints were evaluated using an RGB LED illumination system supplemented with UV light. Specifically, a set of three RGB LED arrays from a conventional CIS scanner were fixed in space about 3 inches away from each print. An image of each print was captured on a 5 megapixel monochrome camera chip featuring gamma table and integration time adjustment to ensure optimal resolution of all 729 color patches without saturating the image sensor. The RGB LED array, the camera chip and the prints were positioned in a light booth to eliminate any stray light on the prints. The light booth used was a GTI MiniMatcher® MM-1e available from GTI Graphic Technology, Inc., Newburgh, N.Y., USA. A control sample of each print was first taken using RGB LED illumination without UV light. A light box having a UV lamp was positioned in the light booth to supply UV light to the prints. Each print was tested with the intensity of the UV light emitted by the UV lamp adjusted from 25% to 75% of its full intensity.

Table 2 below illustrates the effect of adding UV light to an RGB LED illumination system.

TABLE 2

|  | RGB LED only (control) | RGB LED + 25% UV | RGB LED + 50% UV | RGB LED + 75% UV |
|---|---|---|---|---|
| Average ΔRGB | 18.5 | 18.3 | 13.2 | 32.6 |
| Maximum ΔRGB | 60.6 | 62.4 | 52.0 | 71.0 |
| Number of patches with ΔRGB > 17 | 333 | 328 | 239 | 586 |
| Percentage (%) of patches above ΔRGB > 17 | 45.7% | 45.0% | 32.8% | 80.4% |

It was observed that the inkjet print demonstrated significant optical brightener response when UV light was added while the silver halide print did not. As illustrated in Table 2, the average and maximum ΔRGB between the prints decreased as UV light was added to a point where the UV light component overwhelmed the RGB light intensity and the benefits were no longer realized. The above test demonstrated the significance of balancing the amount of UV light relative to the overall RGB light in order to achieve optimal improvement in color fidelity of the respective scan. Accordingly, as discussed above, optimal results are achieved where the spectral distribution of the combination of the RGB light and the UV light is adjusted to match sunlight, conventional fluorescent office light or conventional white light. When the UV light is added to the RGB LED in a proportion similar to that in the spectral power distribution of normal viewing conditions of sunlight, conventional fluorescent office light or conventional white light, originals from different chemical compositions that match in color under these viewing conditions will match more closely when scanned by an RGB+UV LED illumination system.

The foregoing description of several embodiments has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention. It is intended that the scope of the application be defined by the claims appended hereto.

What is claimed is:

1. An illumination system for a scanner, comprising:
   an array of visible light emitting diodes having a red light emitting diode, a blue light emitting diode and a green light emitting diode;
   an ultraviolet light emitting device for emitting light predominantly in the ultraviolet region of the electromagnetic spectrum, the array of the visible light emitting diodes and the ultraviolet light emitting device being positioned to illuminate an object to be scanned; and
   a controller operatively connected to the array of visible light emitting diodes and the ultraviolet light emitting device, wherein, during illuminating the object to be scanned, the controller is configured to operate the red, blue and green light emitting diodes in a sequence to illuminate the object being scanned and, during the sequence, the ultraviolet light emitting device is operated so that the ultraviolet light emitting device and at least one of the red light emitting diode, the blue light emitting diode and the green light emitting diode are simultaneously operated to illuminate the object being scanned.

2. The illumination system of claim 1, wherein the ultraviolet light emitting device is a light emitting diode.

3. The illumination system of claim 2, wherein the array of visible light emitting diodes and the ultraviolet light emitting diode are operatively mounted on a common printed circuit board assembly.

4. The illumination system of claim 1, wherein the array of visible light emitting diodes and the ultraviolet light emitting device are mounted in a housing of the scanner on a scan head frame that is movable in a reciprocating manner.

5. The illumination system of claim 1, wherein the array of visible light emitting diodes and the ultraviolet light emitting device are mounted in a stationary position in a housing of the scanner and an integrating light pipe is positioned to receive light emitted by the array of visible light emitting diodes and the ultraviolet light emitting device and to transmit the received light onto the object being scanned.

6. The illumination system of claim 1, wherein the array of visible light emitting diodes further includes a white light emitting diode.

7. The illumination system of claim 1, wherein the intensity of the ultraviolet light emitting device is adjusted so that the spectral distribution of the illumination system matches the spectral distribution of one of sunlight, conventional fluorescent office light and conventional white light.

8. The illumination system of claim 1 wherein the controller is further configured to perform gamma correction of the ultraviolet light emitting device.

9. The illumination system of claim 1 wherein the controller is further configured to simultaneously operate the ultraviolet light emitting device and the blue light emitting diode during the sequence.

10. The illumination system of claim 1 wherein the controller is further configured to simultaneously operate the ultraviolet light emitting device and the red light emitting diode during the sequence.

11. A document scanner, comprising:
    a housing having a transparent imaging window positioned thereon for supporting a document to be scanned;
    an illumination system disposed within the housing and positioned to illuminate the transparent imaging window, the illumination system including a printed circuit board assembly having an array of light emitting diodes operatively mounted thereto, the array of light emitting diodes including:
      a red light emitting diode, a blue light emitting diode and a green light emitting diode for emitting light predominantly in the visible region of the electromagnetic spectrum; and
      an ultraviolet light emitting diode for emitting light predominantly in the ultraviolet region of the electromagnetic spectrum;
    an image sensor positioned to sense light from the array of light emitting diodes reflected from the document being scanned; and
    a controller operatively connected to the array of diodes and the image sensor, wherein, during illuminating the document to be scanned, the controller is configured to operate the red, blue and green light emitting diodes in a sequence to illuminate the document being scanned and, during the sequence, the ultraviolet light emitting device is operate so that the ultraviolet light emitting diode and at least one of the red light emitting diode, the blue light emitting diode and the green light emitting diode are simultaneously operated to illuminate the object being scanned.

12. The document scanner of claim 11, wherein the printed circuit board assembly is mounted in the housing of the document scanner on a scan head frame that is movable in a reciprocating manner.

13. The document scanner of claim 11, wherein the printed circuit board assembly is mounted in a stationary position in the housing of the document scanner and an integrating light pipe is positioned to receive light emitted by the array of light emitting diodes and to transmit the received light onto substantially the entire imaging window at one time to illuminate substantially the entire document being scanned at one time.

14. The document scanner of claim 11, wherein the printed circuit board assembly includes a plurality of printed circuit board assemblies each having an array of light emitting diodes operatively mounted thereto; each printed circuit board assembly is mounted in a stationary position in the housing of the document scanner; and a plurality of integrating light pipes are each positioned to receive light emitted by a respective array of light emitting diodes and to collectively transmit the received light onto substantially the entire imaging window at one time to illuminate substantially the entire document being scanned at one time.

15. The document scanner of claim 11, wherein the controller is programmed to turn off the ultraviolet light emitting diode when a lid of the document scanner is in an open position.

16. The document scanner of claim 11, wherein the intensity of the ultraviolet light emitting device is adjusted so that the spectral distribution of the illumination system matches the spectral distribution of one of sunlight, conventional fluorescent office light and conventional white light.

17. The document scanner of claim 11 wherein the controller is further configured to perform gamma correction of the ultraviolet light emitting diode.

18. The document scanner of claim 11 wherein the controller is further configured to simultaneously operate the ultraviolet light emitting diode and the blue light emitting diode during the sequence.

19. The document scanner of claim 11 wherein the controller is further configured to simultaneously operate the ultraviolet light emitting diode and the red light emitting diode during the sequence.

20. A method for scanning an object to reduce the occurrence of metameric failure associated with the scan, comprising:

illuminating the object being scanned by activating in a sequence an array of light emitting diodes that emit predominantly visible light, the array having a red light emitting diode, a blue light emitting diode and a green light emitting diode and, during the sequence, activating a light emitting device that emits predominantly ultraviolet light simultaneously with one of the red, blue and green light emitting diodes;

sensing during the sequence the light reflected from an the object being scanned using an image sensor; and processing the sensed reflected light to form an image of the scanned object.

21. The method of claim 20 further comprising simultaneously illuminating the blue light emitting diode and the ultraviolet light emitting device during the sequence.

22. The method of claim 20 further comprising simultaneously illuminating the red light emitting diode and an ultraviolet light emitting device during the sequence.

23. The method of claim 20 further comprising performing gamma correction to linearize the ultraviolet light emitted by the ultraviolet light emitting device.

* * * * *